(12) United States Patent
Ichikawa et al.

(10) Patent No.: US 8,092,935 B2
(45) Date of Patent: Jan. 10, 2012

(54) REACTIVE POLYMER-CARRYING POROUS FILM AND PROCESS FOR PRODUCING THE SAME

(75) Inventors: Tomoaki Ichikawa, Ibaraki (JP); Kazushige Yamamoto, Ibaraki (JP); Yoshihiro Uetani, Ibaraki (JP); Keisuke Kii, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1171 days.

(21) Appl. No.: 11/664,219

(22) PCT Filed: Jul. 20, 2005

(86) PCT No.: PCT/JP2005/013312
§ 371 (c)(1),
(2), (4) Date: Mar. 29, 2007

(87) PCT Pub. No.: WO2006/038362
PCT Pub. Date: Apr. 13, 2006

(65) Prior Publication Data
US 2009/0202898 A1    Aug. 13, 2009

(30) Foreign Application Priority Data

Sep. 30, 2004  (JP) ................................ 2004-286078
Jun. 13, 2005  (JP) ................................ 2005-171916

(51) Int. Cl.
*H01M 2/14* (2006.01)
*H01M 2/16* (2006.01)

(52) U.S. Cl. .................. 429/129; 429/247; 429/254

(58) Field of Classification Search .................. 429/144, 429/145, 247, 254, 129; 156/83; 29/623.1, 29/623.4
See application file for complete search history.

(56) References Cited

U.S. PATENT DOCUMENTS

| | | | | |
|---|---|---|---|---|
| 6,716,553 | B1 * | 4/2004 | Fujita et al. | 429/145 |
| 2004/0101757 | A1 * | 5/2004 | Kii et al. | 429/253 |
| 2004/0157118 | A1 * | 8/2004 | Uetani et al. | 429/144 |
| 2006/0099497 | A1 | 5/2006 | Uetani et al. | |
| 2009/0202898 | A1 | 8/2009 | Ichikawa et al. | |

FOREIGN PATENT DOCUMENTS

| | | |
|---|---|---|
| EP | 1101792 A1 | 5/2001 |
| EP | 1432054 A1 | 6/2004 |
| EP | 1453122 A1 | 9/2004 |
| JP | 5-310989 A | 11/1993 |
| JP | 9-012756 A | 1/1997 |
| JP | 9-161814 A | 6/1997 |
| JP | 10-172606 A | 6/1998 |
| JP | 11-329439 A | 11/1999 |
| JP | 2001-176555 A | 6/2001 |
| JP | 2003-142158 A | 5/2003 |
| JP | 2003-142159 A | 5/2003 |
| JP | 2003-147109 A | 5/2003 |
| JP | 2004-47439 A | 2/2004 |
| JP | 2004-139867 A | 5/2004 |
| JP | 2004-143363 A | 5/2004 |
| JP | 2004-185920 A | 7/2004 |
| JP | 2004-323827 A | 11/2004 |
| JP | 2004-335210 A | 11/2004 |
| JP | 2005-209474 A | 8/2005 |
| JP | 2006-019082 A | 1/2006 |
| JP | 2006-128069 A | 5/2006 |
| JP | 2006-131808 A | 5/2006 |

OTHER PUBLICATIONS

International Search Report.
Extended European Search Report dated Dec. 2, 2009 in Application No. 05766261.1.
Notice of Reasons for Rejection dated Apr. 19, 2011 issued in Japanese Patent Application No. 2005-171916.

* cited by examiner

*Primary Examiner* — Emily Le
*Assistant Examiner* — Carlos Barcena
(74) *Attorney, Agent, or Firm* — Sughrue Mion, PLLC

(57) ABSTRACT

A reactive polymer-supported porous film for a battery separator containing a substrate porous film of a porous film and a reactive polymer supported on the substrate porous film. The porous film has a temperature of 200° C. or more, at which a thickness of the porous film is reduced to ½ of a thickness when a probe is placed on the porous film. The reactive polymer is obtainable by partially crosslinking a crosslinkable polymer and a polyfunctional isocyanate. The crosslinkable polymer is obtainable by copolymerizing a crosslinkable monomer having in a molecule at least one reactive group selected from a 3-oxetanyl group and an epoxy group and a crosslinkable monomer having a reactive group capable of reacting with an isocyanate group.

5 Claims, No Drawings

REACTIVE POLYMER-CARRYING POROUS FILM AND PROCESS FOR PRODUCING THE SAME

FIELD OF THE INVENTION

This invention relates to a reactive polymer-supported porous film useful for producing batteries and capable of contributing to safety for using such batteries as well as to a production process for the batteries using the reactive polymer-supported porous film. This invention further relates to batteries having a separator that is obtainable from the reactive polymer-supported porous film.

BACKGROUND ART

As a process for producing batteries, a method wherein a positive electrode and a negative electrode are laminated with a separator for preventing a short-circuiting between the electrodes being sandwiched therebetween or a positive (negative) electrode, a separator, a negative (positive) electrode, and a separator are laminated in this order; an electrode/separator laminated body is obtained by winding; the electrode/separator laminated body is inserted into a cell; an electrolysis solution is injected into the cell; and the cell is sealed has heretofore been known (see Patent Publications 1 and 2, for example).

In using the thus-obtained battery, there is a problem that, when the battery is left to stand in an abnormally high temperature environment or overcharged or when a short-circuiting occurs between the electrodes inside or outside the battery, the battery is abnormally heated to cause the electrolysis solution inside the battery to spout out of the battery, sometimes resulting in fracture.

Meanwhile, particularly in a production of laminated batteries, a method of adhering electrodes and a separator to each other by using a polyvinylidene fluoride resin solution as an adhesive agent and removing a solvent used for the resin solution under a reduced pressure is employed in many cases. However, this method has problems such as complicated process steps, difficulty in regulating quality of products, and insufficient adhesion between the electrodes and the separator (see Patent Publication 3, for example).

Also, a porous film to be used for separators of batteries is produced, for example, by a method of drawing a molded sheet at a high draw ratio (see patent Publication 4, for example). Therefore, the battery separator made of such porous film has problems that the battery is remarkably shrunk in the high temperature environment where the battery is abnormally heated due to an internal short-circuiting or the like, or, in some cases, the separator itself is melted or broken to fail to function as the separator between the electrodes.

In order to improve the battery safety, it is important to achieve both of heat resistance and a reduction in heat shrinkage ratio of the battery separator in the high temperature environment. In view of such object, in order to suppress the heat shrinkage ratio of the battery separator in the high temperature environment, a method of producing a porous film by a method that does not include the drawing process in the production step has been proposed (see Patent Publication 5, for example). With this method, however, it is difficult to achieve sufficient strength since the porous film is not drawn. As described above, the conventional methods do not realize the simultaneous achievement of the improvement in heat resistance and the reduction in heat shrinkage ratio for the purpose of preventing the melting and broken of the separator in the high temperature environment.

Also, a lithium rechargeable battery that uses a conventional polyethylene porous film as a separator has difficulty in maintaining its initial performance in the case where the lithium rechargeable battery is used in a laptop personal computer (hereinafter referred to as laptop PC), used in a high temperature environment such as in a car in summer, or left to stand for a long time in the high temperature environment in a charging state. For example, when the lithium rechargeable battery is used in the high temperature environment at 50° C. to 90° C., which is a possible temperature inside the laptop PC, the car, or the like or left to stand for a long time in the charging state, the porous film is gradually deformed or deteriorated by oxidation due to an inner tension or pressure of an electrode/separator element, so that air permeability of the porous film is reduced (i.e. a Gurley value is increased), resulting in reduction in battery life. Accordingly, in recent years, there has been a strong demand for development of a lithium rechargeable battery capable of enduring a use in a high temperature environment of about 90° C. and standing in charging state as well as of maintaining high battery characteristics.

Patent Publication 1: JP-A-09-161814
Patent Publication 2: JP-A-11-329439
Patent Publication 3: JP-A-10-172606
Patent Publication 4: JP-A-09-012756
Patent Publication 5: JP-A-05-310989

DISCLOSURE OF THE INVENTION

Problems to be Resolved by the Invention

This invention has been accomplished for the purpose of solving the above-described problems in producing batteries comprising a separator and electrodes adhered to a separator, and an object thereof is to provide a reactive polymer-supported porous film that is capable of achieving sufficient adhesion between the electrode and the separator; reduced in internal resistance; and excellent in high rate characteristics, the porous film being useful as a battery separator which, after production of the battery, is not melted or broken under a high temperature and functions as a separator having a small heat shrinkage ratio. Further, another object of this invention is to provide a process for producing batteries using the reactive polymer-supported porous film.

Yet another object of this invention is to provide a lithium rechargeable battery that has a long battery life and is capable of maintaining excellent battery characteristics in the case where the battery is used in a high temperature environment of 50° C. to 90° C. such as in a laptop PC, a car in summer, and the like or left to stand for a long time in a charging state.

Means of Solving the Problems

According to this invention, there is provided a reactive polymer-supported porous film for a battery separator, characterized in that the reactive polymer-supported porous film comprises: a substrate porous film of a porous film, the porous film has a temperature, at which a thickness of the porous film is reduced to ½ of a thickness when a prove is placed on the porous film in the case that the thickness of the porous film is measured by placing the probe having a diameter of 1 mm on the porous film under a load of 70 g and heating the porous film from a room temperature at a temperature-increase rate of 2° C./minute, of 200° C. or more; and a reactive polymer supported on the substrate porous film, the reactive polymer is obtainable by reacting: a crosslinkable polymer obtainable by copolymerizing: a crosslinkable monomer having in a molecule at least one reactive group selected from a 3-oxetanyl group and an epoxy group; and a crosslinkable monomer having a reactive group capable of reacting with an isocyanate group; and a polyfunctional isocyanate to be partially crosslinked.

Particularly, according to this invention, the substrate porous film preferably comprises a polyolefin resin composition comprising: a polyolefin resin having a weight average molecular weight of at least 500,000; and a crosslinkable rubber having a double bond in a molecular chain, and the substrate porous film is obtainable by crosslinking the crosslinkable rubber.

Further, according to this invention, there is provided a long-life lithium rechargeable battery which is capable of maintaining excellent battery characteristics in the case where the battery is used in a high temperature environment of 50° C. to 90° C. or left to stand in a charging state for a long time.

Advantageous Effects of the Invention

According to this invention, the reactive polymer-supported porous film to be used for battery separators is obtainable by causing a substrate porous film to support a reactive polymer by partially crosslinking a crosslinkable polymer obtainable by copolymerizing a crosslinkable monomer having in a molecule at least one reactive group selected from a 3-oxetanyl group and an epoxy group with a crosslinkable monomer having a reactive group capable of reacting with an isocyanate group through a reaction between the crosslinkable polymer and a polyfunctional isocyanate, wherein the substrate porous film may preferably comprise a polyolefin resin composition of a polyolefin resin having a weight average molecular weight of at least 500,000 and a crosslinkable rubber having a double bond in a molecular chain and is obtainable by crosslinking the crosslinkable rubber.

Therefore, it is possible to obtain an electrode/porous film (separator) bonded material by: laminating an electrode on such reactive polymer-supported porous film to obtain a reactive polymer-supported porous film laminated body; inserting the laminated body into a cell; injecting an electrolysis solution containing a cationic polymerization catalyst into the cell; causing at least a part of the reactive polymer to swell in the electrolysis solution or to elute into the electrolysis solution in the vicinity of a surface boundary between the porous film and the electrode; and causing a cationic polymerization of the reactive group remaining in the reactive polymer, i.e. at least one reactive group selected from the 3-oxetanyl group and the epoxy group, to further crosslink the reactive polymer for gelation of at least a part of the electrolysis solution, thereby firmly adhering the porous film and the electrode to each other.

According to the reactive polymer-supported porous film of this invention, since the reactive polymer is partially crosslinked in advance of dipping the electrode/reactive polymer-supported porous film laminated body into the electrolysis solution, the reactive polymer is swollen with elution and diffusion of the reactive polymer from the electrode/reactive polymer-supported porous film laminated body to the electrolysis solution being suppressed, and, as a result, it is possible to adhere the electrode to the porous film (separator) with the use of a small amount of the reactive polymer and to increase ion permeability of the porous film, thereby enabling the porous film to function well as the separator. Also, the reactive polymer does not adversely affect on the electrolysis solution since it is prevented from being eluted and diffused excessively into the electrolysis solution.

Also, according to this invention, the porous film in the reactive polymer-supported porous film may preferably comprise a polyolefin resin composition of a polyolefin resin having a weight average molecular weight of at least 500,000 and a crosslinkable rubber having a double bond in a molecular chain and is obtainable by crosslinking the crosslinkable rubber. Since a heat resistance temperature of the porous film is 200° C., the porous film does not melted or broken under a high temperature after production of batteries and functions as a separator having a small heat shrinkage ratio. Therefore, by using the reactive polymer-supported porous film, it is possible to obtain batteries excellent in safety at high temperatures.

Further, since the lithium rechargeable battery according to this invention has the separator obtainable from the above-described reactive polymer-supported porous film and, more specifically, has the electrode/separator bonded material formed as described above, the lithium rechargeable battery endures use and storage in a high temperature environment of about 90° C. as well as standing in a charging state, thereby maintaining high battery characteristics.

BEST MODE FOR CARRYING OUT THE INVENTION

The reactive polymer-supported porous film for a battery separator of the invention is that a porous film having a temperature, at which a thickness of the porous film is reduced to ½ of a thickness when a prove is placed on the porous film in the case that the thickness of the porous film is measured by placing the probe having a diameter of 1 mm on the porous film under a load of 70 g and heating the porous film from a room temperature at a temperature-increase rate of 2° C./minute, of 200° C. or more is used as a substrate porous film, and a reactive polymer obtainable by reacting: a crosslinkable polymer obtainable by copolymerizing: a crosslinkable monomer having in a molecule at least one reactive group selected from a 3-oxetanyl group and an epoxy group; and a crosslinkable monomer having a reactive group capable of reacting with an isocyanate group; and a polyfunctional isocyanate to be partially crosslinked is laminated on the substrate porous film.

The substrate porous film may preferably comprise a polyolefin resin composition of a polyolefin resin having a weight average molecular weight of at least 500,000 and a crosslinkable rubber having a double bond in a molecular chain and is obtainable by crosslinking the crosslinkable rubber.

More specifically, a reactive polymer-supported porous film for battery separators is obtainable by causing the substrate porous film having the above-described heat characteristics to support the crosslinkable polymer obtainable by copolymerizing a radically polymerizable monomer having in a molecule at least one reactive group selected from a 3-oxetanyl group and an epoxy group and a radically polymerizable monomer having a reactive group capable of reacting with an isocyanate group and a polyfunctional isocyanate, and then reacting the crosslinkable polymer with the polyfunctional isocyanate to obtain a partially crosslinked reactive polymer. When the porous film functions as a separator in a battery as described later in this specification, the separator does not melt or break easily and maintains its thickness under a high temperature and has a small heat shrinkage ratio to prevent a short-circuiting between the electrodes, thereby improving safety of the battery.

Therefore, by using the separator formed of such reactive polymer-supported porous film, it is possible to obtain a long-life lithium rechargeable battery that maintains excellent battery characteristics when used in a high temperature environment of 50° C. to 90° C., which is a possible environment inside a laptop PC or in a car in summer, or left to stand in a charging state for a long time.

Hereinafter, a phenomenon observed through the penetration probe type thermal mechanical analyzer will be described. When a cylindrical probe having a probe diameter of 1 mm is set on a porous film under a load, a thickness is reduced due to the load. This thickness of the porous film is referred to as the initial thickness. After that, the porous film is gradually reduced with an increase in temperature, and, when a resin forming the porous film is melted or semi-melted, the thickness is largely reduced. Then, the thickness is increased a little due to shrinkage. When the temperature is further increased, the thickness starts to be reduced again after the increase in thickness due to the shrinkage in ordinarily used battery separators. According to this invention, a temperature of the porous film at which the thickness of the porous film is reduced to ½ of the initial thickness is defined as a heat resistance temperature of the porous film. The higher the heat resistance temperature is, the higher the temperature that the porous film endures for maintaining the thickness without melting and break. Therefore, by using the porous film as the separator, it is possible to obtain batteries excellent in safety in the high temperature environment.

According to this invention, the substrate porous film is not particularly limited insofar as the porous film has a solvent resistance and an oxidation-reduction resistance in addition to the above-described heat characteristic, and it is possible to use porous films made from a polyolefin resin such as polyethylene, polypropylene, and polybutylene; polyamide; cellulose acetate; polyacrylnitrile; and the like.

However, according to this invention, as the substrate porous film, it is preferable to use a porous film comprising a polyolefin resin composition of a polyolefin resin having a weight average molecular weigh of 500,000 or more and a crosslinkable rubber having a double bond in a molecular chain and obtainable by crosslinking the crosslinkable rubber. The polyolefin resin composition may contain a polyolefin resin having a weight average molecular weight less than 500,000 or a thermoplastic elastomer.

Examples of the polyolefin resin having the weight average molecular weight of 500,000 or more include a polyolefin resin such as polyethylene and polypropylene. The polyolefin resins may be used alone or in combination of two or more. According to this invention, it is preferable to use an ultrahigh molecular weight polyethylene having a weight average molecular weight of 500,000 or more among the above polyolefin resins since a porous film obtained by using such polyethylene has high strength.

As the crosslinkable rubber, a diene-based polymer having a double bond in a molecular chain, such as polybutadiene, polyisoprene, polynorbornene, and a ethylene-propylene-diene monomer ternary copolymer may preferably be used. For instance, polynorbornene is commercially available as Norsorex NB from Zeon Corporation. Also, examples of the diene monomer include dicyclopentadiene, ethylidene norbornene, hexadiene, and the like, and, among the above, ethylidene norbornene may preferably be used from the view point of crosslinking reactivity. More specifically, a ternary copolymer containing ethylidene norbornene as its ingredient is excellent in crosslinking reactivity and capable of more reliably enhancing the heat resistance of the porous film to be obtained. Also, the ternary copolymer containing ethylidene norbornene as its ingredient, for example, has an alicyclic structure and a double bond derived from the diene monomer, and it is possible to use a ternary copolymer of which a part of the double bond is hydrogenated. Also, the ternary copolymer may be a random copolymer, a block copolymer, a graft copolymer, or the like. The ternary copolymers are commercially available as various EPDMs.

In order to sufficiently crosslink the ternary copolymer, a proportion of the diene monomer component in the ternary copolymer may preferably be 3 wt % or more, more preferably 4 to 20 wt %, based on a total weight of ethylene, propylene, and the diene monomer. Particularly, according to this invention, a ternary copolymer of which a weight ratio of ethylene/propylene/diene monomer components is 0.5 to 0.75/0.05 to 0.47/0.03 to 0.2 may preferably be used.

Examples of the polyolefin resin having the weight average molecular weight of less than 500,000 include a polyolefin resin such as polyethylene and polypropylene and a modified polyolefin resin such as an ethylene-acryl monomer copolymer and an ethylene-vinyl acetate copolymer. Examples of the thermoplastic elastomer include polystyrene-based, polyolefin-based, polydiene-based, vinyl chloride-based, polyester-based thermoplastic elastomers and the like. The polyolefin resins and the thermoplastic elastomers may be used alone or in combination of two or more. Also, those having a double bond in a molecule among the above thermoplastic elastomers may be used as the crosslinkable rubber.

According to this invention, as the polyolefin resin having the weight average molecular weight of less than 500,000, a low melting point polyethylene resin, a crystalline polyolefin-based elastomer, a graft copolymer having low melting temperature polymethacrylic acid esters in a side chain, and the like are preferred since they contribute to a low shut down temperature.

According to this invention, as the substrate porous film, the one comprising the polyolefin resin composition having the weight average molecular weight of 500,000 or more and the crosslinkable rubber having a double bond in a molecular chain and obtainable by crosslinking the crosslinkable rubber may preferably be used as described above, and a proportion of the polyolefin resin having the weight average molecular weight of 500,000 or more may preferably be in the range of 5 to 95 wt %, particularly in the range of 10 to 90 wt %, in view of strength of the porous film to be obtained from the polyolefin resin composition and balance with other components. In turn, a proportion of the crosslinkable rubber in the polyolefin resin composition may preferably be 3 wt % or more, particularly from 5 to 35 wt %.

When the proportion of the crosslinkable rubber is less than 3 wt % in the polyolefin resin composition, there is a fear that heat resistance of the porous film to be obtained is not satisfactorily improved by the crosslinking by the crosslinkable rubber.

Further, according to this invention, the polyolefin resin composition for producing the porous film may contain the polyolefin resin having the weight average molecular weight of less than 500,000 and the thermoplastic elastomer when so required, and, in such case, a proportion of a total amount of the polyolefin resin and the thermoplastic elastomer in the polyolefin resin composition may preferably be in the range of 1 to 50 wt %. By using such components for the substrate porous film, the porous film to be obtained exhibits the shut down function at a lower temperature.

Hereinafter, a production of the porous film comprising the polyolefin resin composition of the polyolefin resin having the weight average molecular weight of at least 500,000 and the crosslinkable rubber having a double bond in a molecule and obtainable by crosslinking the crosslinkable rubber will be described. The porous film is obtainable by forming a film by an appropriate one of conventional methods such as dry film formation and wet film formation and then crosslinking the crosslinkable rubber in the film.

More specifically, the polyolefin resin composition is mixed with a solvent, followed by kneading and heat melting to obtain a kneaded material, and the kneaded material is molded into a sheet by using an appropriate method. The sheet is pressed, followed by uniaxial or biaxial drawing to obtain a film, and then the solvent is removed from the film by extraction to obtain the porous film. After that, by using the double bond of the crosslinkable rubber of the porous film, the crosslinkable rubber is crosslinked so that the porous film has the required heat resistance.

In the porous film production, as the solvent to be used for obtaining the slurry-like kneaded material, aliphatic or alicyclic hydrocarbon such as nonane, decane, undecane, dodecane, decalin, and liquid paraffin; a mineral fraction of which a melting point corresponds to these solvents; and the like are usable, and a nonvolatile solvent containing a large amount of alicyclic hydrocarbon such as liquid paraffin may preferably be used.

A proportion of the polyolefin resin composition in the slurry-like kneaded material may preferably be in the range of 5 to 30 wt %, more preferably in the range of 10 to 30 wt %, and most preferably in the range of 10 to 25 wt %. More specifically, the proportion of the polyolefin resin composition in the slurry-like kneaded material may preferably be 5 wt % or more in order to improve the strength of the porous film to be obtained and may preferably be 30 wt % or less in order to sufficiently dissolve the polyolefin resin having the weight average molecular weight of 500,000 or more into the solvent as well as to achieve a fully stretched state of the kneaded material and sufficient entanglement of polymer chain. Also, an additive such as an antioxidant, an ultraviolet ray absorber, a dye, a nucleating agent, a pigment, and an antistatic agent may be added in an amount that does not undermine the object of this invention.

After mixing the polyolefin resin composition with the solvent and kneading the mixture, an appropriate one of conventional methods may be used for molding a sheet from the slurry-like kneaded material. For example, the polyolefin resin composition and the solvent are kneaded by batch using a bunbury mixer, a kneader, or the like, and the thus-obtained kneaded material is drawn between a pair of cooled rollers or sandwiched between a pair of cooled metal plates and cooled by rapid cooling crystallization to obtain a sheet. Alternatively, the kneaded material may be molded into a sheet by using an extruder provided with a T-die or the like. A temperature for the kneading may preferably be in the range of 100° C. to 200° C. without particular limitation thereto.

A thickness of the thus-obtained sheet may preferably be in the range of 3 to 20 mm without particular limitation thereto. The sheet may be pressed by using a heat press or the like to achieve a thickness of 0.5 to 3 mm. The pressing may preferably be performed at a temperature of 100° C. to 140° C. In order to draw the obtained sheet, ordinary tentering, pressing, inflation, or a combination thereof may be employed, or any one of uniaxial drawing, biaxial drawing, and the like may be employed without limitation thereto. In the case of the biaxial drawing, either one of simultaneous vertical/horizontal drawing or sequential drawing may be employed. A temperature for the drawing may preferably be in the range of 100° C. to 140° C.

A desolvation treatment is a treatment for removing the solvent from the sheet to form a porous structure, and it is possible to perform the treatment by removing the residual solvent by washing the sheet with a solvent. As the solvent, a volatile solvent such as hydrocarbon including pentane, hexane, heptane, decane, etc.; chlorinated hydrocarbon including methylene chloride, carbon tetrachloride, etc.; fluorinated hydrocarbon including ethane trifluoride etc.; ethers including diethylether, dioxane, etc.; alcohols including methanol, ethanol, etc.; and ketones including acetone, methylethylketone, etc.; and the like may be used. These may be used alone or in combination of two or more. The desolvation treatment of the sheet using such solvent is performed by dipping the sheet into the solvent or showering the solvent on the sheet.

According to this invention, it is preferable to perform a heat treatment after obtaining the porous film from the polyolefin resin composition as described above in order to reduce a heat shrinkability of the porous film. The heat treatment may be a one-stage heat treatment wherein the porous film is heated once or may be a multistage heat treatment wherein the porous film is heated at a relatively low temperature and then at a higher temperature. Also, a temperature rising heat treatment wherein the porous film is heated by raising a temperature thereof may be performed. However, the temperature rising heat treatment must be performed without deteriorating the desirable characteristics of the porous film, such as air permeability.

A heating temperature in the case of the one-stage heat treatment may preferably be in the range of 40° C. to 140° C., though it may vary depending on the composition of the porous film. According to the temperature rising or multistage heat treatment wherein the heating temperature is relatively low at the start of the heating and then raised, it is possible to perform the crosslinking of the crosslinkable rubber in the porous film simultaneously with the heat treatment. Further, since the heat resistance of the porous film is gradually improved, it is possible to perform the heat treatment without losing the desirable characteristics of the porous film such as air permeability as well as to accomplish the heat treatment in a short time. Particularly, in the multistage heat treatment, the initial heating temperature may preferably be in the range of 40° C. to 90° C., and the heating temperature in the second stage may preferably be in the range of 90° C. to 140° C., though the heating temperatures may vary depending on the composition of the porous film.

According to this invention, the crosslinkable rubber in the porous film is crosslinked during the heat treatment or before or after the heat treatment as described in the foregoing in order to improve the heat resistance of the porous film to be obtained. By crosslinking the crosslinkable rubber, the heat resistance (breaking resistance) at a high temperature of the porous film to be obtained is remarkably improved. As described above, it is preferable to crosslink the crosslinkable rubber in the porous film simultaneously with the heat treatment of the porous film in view of the productivity, and it is possible to reduce the heat shrinkability of the porous film at the same time with greatly improving the heat resistance of the porous film by crosslinking the crosslinkable rubber in the porous film simultaneously with the heat treatment of the porous film.

In order to crosslink the crosslinkable rubber in the porous film, it is sufficient to cause the crosslinking reaction of the crosslinkable rubber by heating the porous film in the presence of oxygen, ozone, an oxygen compound, and the like, and it is preferable to crosslink the crosslinkable rubber by heating the porous film in the presence of oxygen, such as in the air, and then irradiating the porous film with a ultraviolet ray or electron beam. Also, when so required, it is possible to accelerate the desired crosslinking reaction by using a conventional peroxide. Plural crosslinking methods may be employed when so required.

A part of carbon-carbon double bonds (C=C) present in molecules of the crosslinkable rubber disappears when the heat treatment is performed in the presence of oxygen so that the crosslinkable rubber is crosslinked with the crosslinkable rubber or the polyolefin resin. It is possible to observe the disappearance of the carbon-carbon double bond by infrared ray absorption spectrum, and, since absorption of peaks indicating a carbonyl group (>C=O) and a hydroxyl group (—OH) is confirmed, generation of polar groups such as a hydroxyl group, an ester group, and a carboxyl group due to the heat treatment is confirmed.

Since it is confirmed from measurement of viscoelasticity that fluidity at a high temperature is suppressed after the heat treatment in the presence of oxygen, a certain crosslinking structure is considered to be formed. Mechanism of the crosslinking reaction by the heat treatment in the presence of oxygen can be estimated as follows, though it is complicated and has not been fully clarified.

Firstly, a polymer radical generated by the action of oxygen adheres to the carbon-carbon double bond, and the crosslinking reaction occurs between the crosslinkable rubber and the crosslinkable rubber or the polyolefin resin by the adherence, so that the ternary structure is formed.

Secondary, a glass transition temperature is greatly increased due to the conversion from the carbon-carbon double bond to the carbon-carbon single bond (C—C) of the crosslinkable rubber. For instance, the glass transition temperature of polynorbornene is 35° C., and the glass transition temperature is increased to 110° C. when the carbon-carbon double bond is hydrogenated to be converted into a carbon-carbon single bond. The reason for the increase in glass transition temperature due to the conversion from the carbon-carbon double bond to the carbon-carbon single bond is the presence of an aliphatic ring in a main chain, and the increase in glass transition temperature is assumed to be one of main factors for the high heat resistance.

Thirdly, in view of the fact that the polar groups such as the hydroxyl group, the ester group, and the carboxyl group are generated due to the oxidation action, it is considered that the pseudo crosslinking based on the polar groups are one of factors for the improvement in heat resistance.

In this invention, since the substrate porous film functions as a separator after the production of a battery, a film thickness of the substrate porous film may preferably be in the range of 3 to 60 μm, particularly in the range of 5 to 50 μm. When the film thickness is less than 3 μm, an internal short-circuiting can occur when used as a separator in a battery due to insufficient strength. When the film thickness is more than 60 μm, internal resistance of a battery is excessively large due to a large electrode-electrode distance. Also, the substrate porous film may preferably have an average pore diameter of 0.01 to 5 μm and a porosity of 20% to 80%, particularly 25% to 75%. Further, the substrate porous film may preferably have air permeability, which is detected in accordance of JIS P 8117, of 100 to 1,000 seconds/100 cc, particularly 100 to 900 seconds/100 cc.

The reactive polymer-supported porous film according to this invention, which is to be used for battery separators, is obtainable by reacting, with a polyfunctional isocyanate, a crosslinkable polymer obtainable by copolymerizing a radically polymerizable monomer having in a molecule at least one reactive group selected from a 3-oxetanyl group and an epoxy group and the radically polymerizable monomer having a reactive group capable of reacting with an isocyanate group to obtain a partially crosslinked reactive polymer, and then causing the above-described substrate porous film to support the partially crosslinked reactive polymer.

The reactive group (hereinafter referred to as isocyanate reactive group) capable of reacting with the isocyanate group contained in the crosslinkable polymer obtained by the copolymerization is reacted with the polyfunctional isocyanate to obtain the partially crosslinked reactive polymer from the crosslinkable polymer, and the substrate porous film is caused to support the partially crosslinked reactive polymer to obtain the reactive polymer-supported porous film for battery separators. The isocyanate reactive group is not particularly limited insofar as it is a functional group having an active hydrogen capable of reacting with an isocyanate group, and examples thereof include a hydroxyl group, a carboxyl group, an amino group, an imino group, a urethane group, a urine group, and the like. Among the above, the hydroxyl group or the carboxyl group is preferred.

As described above, the crosslinkable polymer is obtainable through the radical copolymerization of the radically polymerizable monomer having in a molecule at least one reactive group selected from the 3-oxetanyl group and the epoxy group and the radically polymerizable monomer having the isocyanate reactive group by using a radical polymerization initiator.

According to this invention, the radically polymerizable monomer having the isocyanate reactive group (isocyanate reactive group-containing radically polymerizable monomer) is used in an amount of 0.1 to 10 wt %, preferably 0.5 to 5 wt %, with respect to a total monomer amount. When the isocyanate reactive group-containing radically polymerizable monomer is more than 10 wt % of the total monomer amount, a crosslinking density achieved by the partial crosslinking of the crosslinkable polymer through the reaction between the polyfunctional isocyanate and the crosslinkable polymer becomes large, and the crosslinkable polymer to be generated becomes dense to have difficulty in swelling in the electrolysis solution, so that it is difficult to obtain batteries excellent in characteristics. However, when the isocyanate reactive group-containing radically polymerizable monomer is less than 0.1 wt % of the total monomer amount, suppression of elution and diffusion of the reactive polymer obtained by partially crosslinking the crosslinkable polymer becomes insufficient to cause elution and diffusion of a large amount of the reactive polymer into the electrolysis solution, or more. Contrarily, when the mixing ratio of the luminous body 3 is too large, stretching and phase separation of an orientation base material (translucent resin 1 or material forming minute regions 2) may be influenced, so that the mixing ratio may be suitably determined within the range resulting in no such influence. An upper limit of the mixing ratio is preferably 10% by weight or less, and more preferably 5% by weight or less.

In a case where the molecular orientation is made by subjecting the above combination of materials to the stretching treatment, the optical element 10 suitable for each application or purpose can be formed by appropriately setting a stretching temperature and stretching ratio for the combination of a polymer and a liquid crystal and a combination of an isotropic polymer and an anisotropic polymer, or by appropriately controlling the stretching conditions for the combination of anisotropic polymers. While anisotropic polymers are classified into positive and negative based on a characteristics of refractive index variation by the stretching direction, any one of positive and negative anisotropic polymers can be used in this embodiment. Accordingly, the combination of positive anisotropic polymers, the combination of negative polymers, and the combination of positive and negative polymers are all possible to use.

As examples of the above polymers, there may be mentioned ester polymers such as polyethylene terephthalate and polyethylene naphthalate, styrene polymers such as polystyrene and acrylonitrile-styrene copolymer (AS polymers), olefin polymers such as polyethylene, polypropylene, cyclic polyolefine and polyolefins having a norbornene structure, and ethylene/propylene copolymer, acrylic polymers such as polymethyl in which the crosslinkable polymer having in a molecule at least one reactive group selected from the 3-oxetanyl group and the epoxy group is copolymerized with the crosslinkable monomer having the isocyanate reactive group, the 3-oxetanyl group-containing radically polymerizable monomer and/or the epoxy group-containing radically polymerizable monomer is used in an amount of 5 to 50 wt %, preferably 10 to 30 wt %, of a total monomer amount. Accordingly, in the case of obtaining the crosslinkable polymer containing the 3-oxetanyl group, the 3-oxetanyl group-containing radically polymerizable monomer is used in an amount of 5 to 50 wt %, preferably 10 to 30 wt %, of the total monomer amount, and, likewise, in the case of obtaining the crosslinkable polymer containing the epoxy group, the epoxy group-containing radically polymerizable monomer is used in an amount of 5 to 50 wt %, preferably 10 to 30 wt %, of the total monomer amount.

In the case of using both of the 3-oxetanyl group-containing radically polymerizable monomer and the epoxy group-containing radically polymerizable monomer, a total amount of the 3-oxetanyl group-containing radically polymerizable monomer and the epoxy group-containing radically polymerizable monomer is 5 to 50 wt %, preferably 10 to 30 wt %, of the total monomer amount, and the epoxy group-containing polymerizable monomer is used in an amount of 90 wt % or less of the 3-oxetanyl group-containing radically polymerizable monomer and the epoxy group-containing radically polymerizable monomer.

In obtaining the 3-oxetanyl group-containing radically polymerizable monomer or the epoxy group-containing radically polymerizable monomer, when the total amount of the 3-oxetanyl group-containing radically polymerizable monomer and the epoxy group-containing radically polymerizable monomer is less than 5 wt % of the total amount of monomers, the amount of crosslinkable polymer required for gelling the electrolysis solution is increased as described in the foregoing, thereby deteriorating performance of batteries to be obtained. When the total amount is more than 50 wt %, property of the formed gel for retaining the electrolysis solution is reduced to reduce the electrode/separator adhesion in batteries to be obtained.

According to this invention, 3-oxetanyl group-containing (meth)acrylate may preferably be used as the 3-oxetanyl group-containing radically polymerizable monomer. Specific examples of such 3-oxetanyl group-containing (meth)acrylate include 3-(oxetanylmethyl(meth)acrylate, 3-methyl-3-(oxetanylmethyl(meth)acrylate, 3-ethyl-3-(oxetanylmethyl (meth)acrylate, 3-butyl-3-(oxetanylmethyl(meth)acrylate, 3-hexyl-3-(oxetanylmethyl(meth)acrylate, and the like. These (meth)acrylates are used alone or in combination of two or more.

According to this invention, epoxy group-containing (meth)acrylate may preferably be used as the epoxy group-containing radically polymerizable monomer. Specific examples of such epoxy group-containing (meth)acrylate include 3,4-epoxycyclohexylmethyl(meth)acrylate, glycidyl (meth)acrylate, and the like. These (meth)acrylates are used alone or in combination of two or more.

In accordance with this invention, radically polymerizable monomer other than the 3-oxetanyl group-containing radically polymerizable monomer and/or the epoxy group-containing radically polymerizable monomer may be copolymerized when so required. As the other radically polymerizable monomers, at least one selected from (meth)acrylate and vinylester may preferably be used. Specific examples of (meth)acrylate include methyl(meth)acrylate, ethyl(meth) acrylate, propyl(meth)acrylate, butyl(meth)acrylate, 2,2,2-trifluoroethyl(meth)acrylate, 2,2,3,3-tetrafluoropropyl (meth)acrylate, and the like. Specific examples of vinylester include vinyl acetate, vinyl propionate, and the like.

In order to radically copolymerize the crosslinkable monomer having in a molecule at least one reactive group selected from the 3-oxetanyl group and the epoxy group with the crosslinkable monomer having the isocyanate reactive group in the presence of the radical polymerization initiator, any one of solution polymerization, block polymerization, suspension polymerization, emulsion polymerization, and the like may be employed, and it is preferable to perform the solution polymerization or the suspension polymerization from the view point of adjustment of molecular weight, post-treatment, and the like. Also, as the radical polymerization initiator, N,N'-azobisisobutylonitrile, dimethyl-N,N'-azobis(2-methylpropionate), benzoyl peroxide, lauroyl peroxide, and the like may be used without particular limitation thereto. Also, in this radical copolymerization, a molecular amount adjusting agent such as mercaptan may be used when so required.

In this invention, the crosslinkable polymer may preferably have a weight average molecular weight of 10,000 or more. When the weight average molecular weight of the crosslinkable polymer is less than 10,000, a large amount of the crosslinkable polymer is required for gelling the electrolysis solution, resulting in deterioration of characteristics of batteries to be obtained. The upper limit of the weight average molecular weight of the crosslinkable polymer for the purpose of retaining the electrolysis solution as a gel may be about 3,000,000, preferably about 2,500,000 without particular limitation thereto. According to this invention, the weight average molecular weight of the crosslinkable polymer may particularly preferably be in the range of 100,000 to 2,000,000.

The crosslinkable polymer having in a molecule at least one reactive group selected from the 3-oxetanyl group and the epoxy group has heretofore been known as is disclosed in JP-A-2001-176555 and JP-A-2002-110245.

The polyfunctional isocyanate for partially crosslinking the crosslinkable polymer is not particularly limited, and examples of usable polyfunctional isocyanate include aromatic, aromatic-aliphatic, alicyclic, and aliphatic polyfunctional isocyanates such as phenylene diisocyanate, tolylene diisocyanate, diphenylmethane diisocyanate, diphenylether diisocyanate, hexamethylene diisocyanate, cyclohexane diisocyanate, triphenylmethane triisocyanate, and tris(phenylisocyanate)thiophosphate, and bulk isocyanates thereof. Also, an isocyanate adduct obtained by attaching polyol such as trimethylol propane to diisocyanate may preferably be used.

The reactive polymer-supported porous film for battery separators according to this invention is obtainable by partially crosslinking the crosslinkable polymer by reacting the crosslinkable polymer with the above-described polyfunctional isocyanate compound to obtain the reactive polymer and then causing the porous film to support the reactive polymer. In order to cause the porous film to support the crosslinkable polymer, the crosslinkable polymer is dissolved into an appropriate solvent such as acetone, ethyl acetate, butyl acetate, and toluene together with the polyfunctional isocyanate compound, and then the solution is coated on the substrate porous film to impregnate the substrate porous film with the solution by an appropriate method such as casting and spray coating, followed by drying and solvent removal. Then, the porous film supporting the crosslinkable polymer and the polyfunctional isocyanate compound is heated to an appropriate temperature to react the crosslinkable polymer with the polyfunctional isocyanate compound for partially crosslinking the crosslinkable polymer. The reactive polymer-supported porous film for battery separators according to this invention is obtained as described above.

In this invention, the method of causing the substrate porous film to support the reactive polymer obtained by partially crosslinking the crosslinkable polymer by the polyfunctional isocyanate compound is not limited to the above example, and a solution of the crosslinkable polymer may be coated on the porous film, followed by drying, and then a solution of the polyfunctional isocyanate compound may be coated on the porous film for impregnation, followed by drying and heating to an appropriate temperature. Also, when so required, a solution containing the crosslinkable polymer may be coated on a removable sheet, followed by drying, transfer onto the substrate porous film and beating to an appropriate temperature.

When causing the substrate porous film to support the reactive polymer, the reactive polymer may be supported by both sides or one side of the substrate porous film. In the case where the reactive polymer is supported by one side of the substrate porous film, in order to suppress oxidation degradation of the porous film (separator) due to use of battery in the high temperature environment and standing in charging state as well as to prevent deterioration in battery characteristics in such high temperature environment, it is important to place the reactive polymer on the side of the porous film facing to at least the positive electrode in the production of a battery.

As described in the foregoing, there is a demand for the battery capable of maintaining a high discharge characteristics even when it is used in the high temperature environment of 50° C. to 90° C. which is a possible temperature inside a laptop PC and a car in summer or left to stand for a long time in a charging state in the high temperature environment. However, when the conventional lithium ion rechargeable battery is left in the high temperature environment, parts constituting the battery, such as electrodes, an electrolyte, and a separator are deteriorated to result in deterioration of charge/discharge characteristics. It is possible to evaluate the discharge characteristics of a battery after being left to stand for a long time in the charging state in the high temperature environment through comparison of discharge capacities before and after the standing in the high temperature environment, and, in order to assume a severe environment, it is desirable to evaluate the discharge characteristics through comparison of discharge capacities before and after standing in a high temperature environment of 70° C. or more. Desirable discharge capacity after the standing in the high temperature environment is such that a discharge amount is high even when a discharge rate is high; however, it is sufficient when a discharge capacity by the rate of 1 CmA is kept high from the practical point of view.

Generally, the deterioration of materials constituting a battery (ex. deterioration of conventional separator made from a porous film obtainable by forming a film from a hydrocarbon polymer such as polyethylene), which occurs when the battery is used in the high temperature environment or left to stand in the charging state in the high temperature environment, is considered attributable to selective oxidation of a separator surface facing to the positive electrode among electrode/separator surface boundaries. The deterioration in the separator surface facing to the positive electrode is confirmed by brownish discoloration of the surface, and the brownish discoloration is caused by generation of conjugated double bond in a polymer chain of the hydrocarbon-based polymer constituting the separator due to withdrawal of a hydrogen atom from a carbon atom of the polymer chain.

Mechanism of adverse affection on the battery charge/discharge characteristics has not been clarified yet, but it is considered that the generation of conjugated double bond in polymer chain of the hydrocarbon-based polymer forming the separator adversely affects on the battery reaction in the positive electrode to deteriorate the battery charge/discharge characteristics. Also, it is confirmed that, after the brownish discoloration in the high temperate environment, the characteristics of the deteriorated separator, such as air permeability, is deteriorated, and such deterioration in air permeability is considered as one of major factors for the deterioration in charge/discharge characteristics.

As described above, since one of the major factors for the reduction in battery charge/discharge characteristics in the high temperature environment is based on the oxidation degradation in the case where the separator is formed from the porous film obtained by forming a film from a hydrocarbon-based polymer such as polyethylene, it is expected that the reduction in charge/discharge characteristics is suppressed even when the battery is used in the high temperature environment or stored in the high temperature environment for a long time insofar as the oxidation deterioration of the separator at the positive electrode/separator surface boundary is suppressed.

Therefore, with the use of the reactive polymer-supported porous film according to this invention as the separator, it is possible to place the reactive polymer supported by the substrate porous film in the positive electrode/separator boundary surface, thereby making it possible to suppress the oxidation degradation of the separator surface facing to the positive electrode. In actuality, when the reactive polymer which is supported by the porous film in such a fashion that the reactive polymer faces at least the positive electrode is used as the separator, the discoloration and the generation of carbon-carbon conjugate double bond are not observed on the separator surface facing to the positive electrode, and the reduction in air permeability of the separator hardly or never occurs. Thus, according to this invention, it is possible to effectively prevent the separator oxidation degradation by causing the porous film to support the reactive polymer in such a fashion that the reactive polymer faces to at least the positive electrode and using the reactive polymer-supported porous film as the separator.

According to this invention, it is desirable that the reactive polymer obtained by partially crosslinking the crosslinkable polymer has a gel fraction in the range of 5% to 80%. As used herein, the gel fraction is a value defined by $(C/(A+B) \times 100)$ (%) in the case where the porous film is caused to support $(A+B)$ parts by weight of the crosslinkable polymer/polyfunctional isocyanate compound mixture comprising A parts by weight of the crosslinkable polymer and B parts by weight of the polyfunctional isocyanate compound and then subjected to the reaction for partially crosslinking the crosslinkable polymer to obtain the reactive polymer, followed by dipping the reactive polymer-supported porous film into ethyl acetate at 23° C. for 7 days and drying. An amount of the reactive polymer remaining on the porous film after the drying is represented by C.

In order to obtain the reactive polymer having the gel fraction in the range of 5% to 90% by reacting the crosslinkable polymer with the polyfunctional isocyanate compound and then partially crosslinking the crosslinkable polymer, the crosslinkable polymer and the polyfunctional isocyanate are mixed in an appropriate solvent so that the isocyanate group of the polyfunctional isocyanate compound is 0.01 to 5.0 parts by mol, preferably 0.05 to 3.0 parts by mol, with respect to 1 part by mol of the isocyanate reactive group of the crosslinkable polymer, without limitation thereto, and then coating the mixture on the substrate porous film, followed by drying, heating, and allowing the crosslinking reaction of the crosslinkable polymer until characteristics of the reactive polymer to be obtained are stabilized.

A heat cure temperature and a time period thereof may vary depending on the crosslinkable polymer and the polyfunctional isocyanate to be used, and it is possible to set such reaction conditions by experiments. Generally, it is possible to complete the crosslinking reaction and to obtain the reactive polymer having the above-described gel fraction and stable characteristics by heating and reacting at 50° C. for 48 hours.

In the case where the gel fraction of the reactive polymer is less than 5%, when an electrode/porous film laminated body obtained by crimping electrodes to a porous film supporting such reactive polymer is dipped into an electrolysis solution, a large amount of the reactive polymer is eluted and diffused into the electrolysis solution to fail to achieve effective adhesion between the electrodes and the porous film after crosslinking the reactive polymer by further cationic polymerization. In the case where the gel fraction of the reactive polymer is more than 80%, when an electrode/porous film laminated body obtained by using the reactive polymer is dipped into an electrolysis solution, swelling of the reactive polymer is insufficient, a battery having an electrode/porous film bonded material obtained by using the reactive polymer has high internal resistance and undesirable battery characteristics. Particularly, according to this invention, the gel fraction of the reactive polymer may preferably be in the range of 10% to 60%, most preferably 10% to 40%.

As described in the foregoing, the reaction product, i.e. the reactive polymer, obtained by reacting the crosslinkable polymer with the polyfunctional isocyanate and then partially reacting and crosslinking the reactive polymer according to this invention is suppressed in elution and diffusion into the electrolysis solution when dipped into the electrolysis solution. Therefore, by obtaining an electrode/porous film laminated body by causing the porous film to support the reactive polymer having the gel fraction of 5% to 80% followed by laminating electrodes on the reactive polymer-supported porous film, inserting the electrode/porous film laminated body into a cell, and injecting an electrolysis solution containing an electrolyte containing a cationic polymerization catalyst into the cell, only a part of the reactive polymer in the electrode/porous film laminated body is swollen in the electrolysis solution or eluted into the electrolysis solution, so that cationic polymerization is advanced by the cationically polymerizable functional group by the cationic polymerization catalyst in the electrolysis solution, preferably by the electrolyte serving as the cationic polymerization catalyst. Thus, the electrolysis solution is gelled to have the electrodes adhered to the porous film with good adhesion and firmness, thereby enabling to obtain an electrode/porous film (separator in a battery to be obtained) bonded material.

In the porous film supporting the partially crosslinked reactive polymer, the reaction and the crosslinking of the reactive polymer do not advance further in the absence of the cationic polymerization catalyst, so that the reactive polymer is stabilized and is not altered after a long term storage.

Further, according to this invention, an electrode/porous film laminated body is obtained by laminating electrodes on the reactive polymer-supported porous film as described later in this specification, and the electrode/porous film laminated body is dipped into an electrolysis solution containing a cationic polymerization catalyst, preferably into an electrolysis solution containing an electrolyte serving also as a cationic polymerization catalyst, so that at least a part of the crosslinkable polymer partially crosslinked on the porous film, i.e. of the reactive film, is swollen in the electrolysis solution or eluted and diffused into the electrolysis solution, thereby further crosslinking the reactive polymer by cationic polymerization of a remaining reactive group of the reactive polymer. Thus, the electrolysis solution is gelled in the vicinity of the surface boundary of the porous film and the electrodes to adhere the electrodes and the porous film to each other.

The reactive polymer-supported porous film according to this invention functions as a separator after being incorporated into a battery, and the porous film (separator) according to this invention has a small area heat shrinkage ratio of ordinarily 25% or less, preferably 20% or less, at a high temperature. Hereinafter, a process for producing batteries by using the reactive polymer-supported porous film will be described.

Electrodes are laminated on or wound around the reactive polymer-supported porous film to obtain an electrode/reactive polymer-supported porous film laminated body, and then the laminated body is inserted into a cell formed of a metal can, a laminate film, and the like, followed by terminal welding and the like as required. After that, a certain amount of an electrolysis solution in which a cationic polymerization catalysis has been dissolved is injected into the cell, followed by sealing the cell, and then at least a part of the reactive polymer supported by the reactive polymer-supported porous film is swollen or eluted and diffused in the vicinity of a surface boundary between the porous film and the electrode in the electrolysis solution to allow crosslinking by cationic polymerization. At least a part of the electrolysis solution is gelled by the crosslinking, so that the electrodes and the porous film are adhered to each other. Thus, a battery in which the porous film is used as a separator and the electrodes are firmly attached to the separator is obtained.

In this invention, the reactive polymer so functions as to adhere the electrodes and the porous film to each other by gelling the electrolysis solution at least in the vicinity of the surface boundary between the porous film and the electrodes due to the crosslinking by the cationic polymerization of the reactive group thereof.

In this invention, it is possible to cationically polymerize and crosslink the reactive polymer at a room temperature depending on a structure and an amount thereof supported by the porous film as well as a type and an amount of the cationic polymerization catalyst. However, it is possible to accelerate the cationic polymerization by heating. In this case, depending on a balance between heat resistance of the material constituting the battery and productivity, the heating may be performed at 40° C. to 100° C. for about 0.5 to 24 hours. Also, in order to swell or elute and diffuse a sufficient amount of the polymer for adhering the electrodes to the porous film, the battery may be left to stand for several hours at a room temperature after injecting the electrolysis solution into the cell.

In this invention, it is sufficient that electrodes are laminated on the reactive polymer-supported porous film in the electrode/reactive polymer-supported porous film laminated body, and, therefore, a structure of the electrode/reactive polymer-supported porous film laminated body may be negative electrode/porous film/positive electrode, negative electrode/porous film/positive electrode/porous film, or the like depending on a structure and a shape of the battery.

The electrolysis solution is a solution obtained by dissolving a electrolyte salt into an appropriate solvent. As the electrolyte salt, a salt containing an alkali metal such as hydrogen, lithium, sodium, and potassium; an alkali earth metal such as calcium and strontium; a tertiary or quaternary ammonium salt; or the like as a cation component and an inorganic acid such as hydrochloric acid, nitric acid, phosphoric acid, sulfuric acid, fluoroboric acid, hydrofluoric acid, hexafluorophosphoric acid, and perchloric acid; an organic acid such as carbonic acid, and organic sulfonic acid or fluorine converted organic sulfonic acid; or the like may be used. Among the above, the electrolyte salt having an alkali metal ion as the cationic component may preferably be used.

Specific examples of the electrolyte salt containing the alkali metal ion as the cation component includes, a perchloric acid alkali metal such as lithium perchlorate, sodium perchlorate, and potassium perchlorate; a tetrafluoroboric acid alkali metal such as lithium tetrafluoroborate, sodium tetrafluoroborate, and potassium tetrafluoroborate; a hexafluorophosphoric acid alkali metal such as lithium hexafluorophosphate and potassium hexafluorophosphate; a trifluoroacetic acid alkali metal such as lithium trifluoroacetate; a trifluoromethanesulfonic acid alkali metal such as lithium trifluoromethanesulfonate; and the like.

Particularly, in the case of obtaining a lithium ion rechargeable battery in accordance with this invention, lithium hexafluorophosphate, lithium tetrafluoroborate, lithium perchlorate, and the like are suitably used.

As the solvent for the electrolyte salt to be used in this invention, any of those capable of dissolving the electrolyte salt may be used, and examples of nonaqueous solvent includes cyclic esters such as ethylene carbonate, propylene carbonate, butylene carbonate, and γ-butylolactone; ethers such as tetrahydrofurane and dimethoxyethane; chained esters such as dimethyl carbonate, diethyl carbonate, and ethylmethyl carbonate, which may be used alone or in combination of two or more.

Though the electrolyte salt may be appropriately selected depending on a type and an amount of the solvent to be used, it is ordinarily used in a concentration of 1 to 50 wt % in a gel electrolyte to be obtained.

In this invention, an onium salt may preferably be used as the cationic polymerization catalyst. Examples of the onium salt include an onium salt containing an ammonium salt, a phosphonium salt, an arsonium salt, a stibonium salt, an iodonium salt, or the like as a cation component and a tetrafluoroboric acid salt, hexafluorophosphoric acid salt, a trifluoromethanesulfonic acid salt, a perchloric acid salt, or the like as an anion component, and the like.

According to this invention, however, since each of lithium tetrafluoroborate and lithium hexafluorophosphate functions also as a cationic polymerization catalyst by itself, such electrolyte salts may particularly preferably be used among the above-described electrolyte salts. In this case, lithium tetrafluoroborate and lithium hexafluorophosphate may be used alone or in combination.

EXAMPLES

Hereinafter, this invention will be described by way of examples, but this invention is not limited at all by the examples.

Example 1

Production of Porous Film A

After mixing 16 parts by weight of polyethylene resin composition formed of 8 wt % of a powder of a ring opening polymer of norbornene (Norsorex NB; product of Zeon Corporation; weight average molecular weight: 2,000,000 or more), 12 wt % of a thermoplastic elastomer (TPE824; product of Sumitomo Chemical Co., Ltd.), and 80 wt % of ultrahigh molecular weight polyethylene having a weight average molecular weight of 3,500,000 with 84 parts by weight of a liquid paraffin into a slurry-like state, the mixture was melted and kneaded at 160° C. for about 1 hour. After that, the obtained kneaded material was sandwiched between metal plates cooled to 0° C. for rapid cooling and flattening to obtain a sheet. This sheet was heat-pressed at 115° C. until a thickness thereof reached to 0.5 mm and then biaxially drawn at the same temperature simultaneously in vertical and horizontal directions at a draw ratio of 4.5 for each of the directions, followed by a desolvation treatment using heptane. The thus-obtained porous film was heated in the air at 85° C. for 6 hours, followed by heating at 118° C. for 1.5 hours, to perform a heat treatment on the porous film as well as to crosslink a crosslinkable rubber in the porous film, thereby obtaining a target porous film A. As a result of evaluation of film characteristics of the porous film A in accordance with the method described below, the porous film A has a thickness of 25 μm, a porosity of 50%, and a heat resistance temperature of 370° C.

(Thickness of Porous Film)

Detected based on a measurement using a 1/10000 mm thickness gauge and a ×10000 scanning electron microscopic picture of a cross section of the porous film.

(Porosity of Porous Film)

Calculated from the following expression using a weight W (g) per unit area S ($cm^2$) of the porous film, an average thickness t (cm) of the porous film, and a density d ($g/cm^3$) of the resin constituting the porous film.

$$\text{Porosity (\%)} = (1-(W/S/t/d)) \times 100$$

(Heat Resistance Temperature Measurement of Porous Film by Penetration Probe Type Thermal Mechanical Analyzer)

On a sample stage of a probe type thermal mechanical analyzer (product of Seiko Denshi Kabushiki Kaisha; EXSTAR6000), a 5 mm square-sample of the porous film was placed, and a penetration probe having a tip diameter of 1 mm was rested on the sample. A load of 70 gf was applied on the probe, and the sample was heated from a room temperature by a heating rate of 2° C./minute to measure a change in thickness of the sample. A temperature at which a thickness of the sample was reduced to ½ of the thickness (initial thickness) when the load had been applied thereon was detected as the heat resistance temperature of the sample.

(Preparation of Crosslinkable Polymer A)

In a 500 mL three-neck flask having a reflux cooling tube, 58.4 g of methylmethacrylate, 20.0 g of 3-ethyl-3-oxetanylmethyl methacrylate, 1.6 g of 2-hydroxyethyl methacrylate, 158.0 g of ethyl acetate, and 0.2 g of N,N'-azobisisobutylonitrile were poured and mixed with stirring while introducing a nitrogen gas for 30 minutes, followed by heating to 70° C. to allow radical polymerization for 8 hours. After that, the thus-obtained reaction mixture was cooled to 40° C. To this reaction mixture, 0.2 g of N,N'-azobisisobutylonitrile was added, followed by heating to 70° C. again to allow radical polymerization for 8 hours. Then, the mixture was cooled to 40° C., and 295 g of ethyl acetate was added thereto, followed by stirring until the mixture becomes uniform, to thereby obtain an ethyl acetate solution of the generated polymer (concentration: 15 wt %).

Then, 100 g of the polymer solution was poured into 600 mL of methanol with stirring by a high speed mixer to obtain a precipitation. The precipitated polymer was separated by filtration, washed with methanol for several times, and then placed in a drying tube for drying with a drying nitrogen gas (a dew point: −150° C. or less) obtained by carbureting liquid nitrogen and allowed to pass through the drying tube. Further, the polymer was subjected to vacuum drying in a desiccator for 6 hours to obtain the crosslinkable polymer. The thus-obtained crosslinkable polymer was a white powder and had a weight average molecular weight of 314,000 and a number average molecular weight of 160,000 as a result of molecular weight measurement by GPC.

(Preparation of Reactive Polymer-Supported Porous Film)

After adding 10 g of the crosslinkable polymer A to 90 g of ethyl acetate, the mixture was stirred at a room temperature to obtain a uniform crosslinkable polymer solution. To this crosslinkable polymer solution, 0.204 g of polyfunctional isocyanate (hexamethylene diisocyanate/trimethylolpropane adduct, an ethyl acetate solution, 75% of solid content, Coronate HL manufactured by Japan Polyurethane Industry Co., Ltd.) was added, followed by stirring at a room temperature for dissolution. A ratio of a mole number of an isocyanate group of the polyfunctional isocyanate to a mole number of a reactive group of the crosslinkable polymer was set to 0.2.

After coating the mixture solution of the crosslinkable polymer and the polyfunctional isocyanate on both sides of the porous film A by wire bar (#16), the porous film A was heated at 60° C. to volatilize ethyl acetate to cause the porous film A to support the crosslinkable polymer at a coating density of 2.1 g/m² on each side, thereby obtaining a crosslinkable polymer-supported-porous film. Then, this crosslinkable polymer-supported-porous film was thrown into an incubator of 70° C. for 96 hours to react the crosslinkable polymer supported by the porous film with the polyfunctional isocyanate, thereby partially crosslinking the crosslinkable polymer. Thus, a reactive polymer-supported porous film was obtained. In this reactive polymer-supported porous film, a gel fraction of the reactive polymer was 55.3%.

(Preparation of Electrodes)

After mixing 85 parts by weight of lithium cobaltate (Selseed C-10 manufactured by Nippon Chemical Industrial Co., Ltd.) which is a positive electrode active material, 10 parts by weight of acetylene black (Denka Black manufactured by Denki Kagaku Kogyo Kabushiki Kaisha) which is an electroconductive auxiliary agent, and 5 parts by weight of a vinylidene fluoride resin (KF polymer L #1120 manufactured by Kureha Kagaku Kogyo Kabushiki Kaisha) which is a binder were mixed, and a solid content concentration of the mixture was adjusted to 15 wt % by using N-methyl-2-pyrrolidone to obtain a slurry. This slurry was coated by a thickness of 200 μm on an aluminum foil (power collector) having a thickness of 20 μm, followed by drying at 80° C. for 1 hour, vacuum drying at 120° C. for 2 hours, and roll pressing. Thus, a positive electrode sheet having an active material layer thickness of 100 μm was obtained.

After mixing 80 parts by weight of carbon microbeads (MCMB6-28 manufactured by Osaka Gas Chemicals Co., Ltd.) which is a negative electrode active material, 10 parts by weight of acetylene black (Denka Black manufactured by Denki Kagaku Kogyo Kabushiki Kaisha) which is an electroconductive auxiliary agent, and 10 parts by weight of a vinylidene fluoride resin (KF polymer L #1120 manufactured by Kureha Kagaku Kogyo Kabushiki Kaisha) which is a binder were mixed, and a solid content concentration of the mixture was adjusted to 15 wt % by using N-methyl-2-pyrrolidone to obtain a slurry. This slurry was coated by a thickness of 200 μm on a copper foil (power collector) having a thickness of 20 μm, followed by drying at 80° C. for 1 hour, drying at 120° C. for 2 hours, and roll pressing. Thus, a negative electrode sheet having an active material layer thickness of 100 μm was obtained.

(Assembly of Battery and Evaluation of Battery Characteristics)

The negative electrode sheet, the reactive polymer-supported porous film, and the positive electrode sheet were laminated in this order to obtain a separator/electrode laminated body, and the separator/electrode laminated body was inserted into a coin type battery can having the size of 2016 and used also as a positive/negative electrode plate. The battery can was filled with an electrolysis solution which was a mixture solvent of ethylene carbonate/diethyl carbonate (weight ratio: 1/2) in which lithium hexafluorophosphate was dissolved at a concentration of 1.2 mol/L, and the battery can was sealed. After that, the battery can was heated at 50° C. for 24 hours to cationically polymerize and crosslink the reactive polymer, thereby attaching the electrode sheets to the porous film (separator) and partially gelling the electrolysis solution. Thus, a coin type battery was obtained.

This battery was subjected to 3 times of charging/discharging at a rate of 0.2 CmA (capacity at the third discharge at 0.2 CmA was evaluated as a discharge capacity at 0.2 CmA), a discharge at 0.2 CmA, and a discharge at a rate of 1 CmA to detect a discharge capacity at a rate of 1 CmA. A discharge capacity maintaining ratio of 1 CmA/0.2 CmA was evaluated to be 95%. The capacity at the third discharge at 0.2 CmA was evaluated as a discharge capacity at 0.2 CmA before a high temperature storage.

(High Temperature Storage Test)

The coin type battery was charged again at a rate of 0.2 CmA until fully charged. This battery was stored in a temperature controlled room at 85° C. for 2 days and then taken but of the temperature controlled room. When the coin battery reached to an ambient temperature (25° C.), two discharges at a rate of 0.2 CmA and a discharge at a rate of 1 CmA were performed to detect a discharge capacity at the 1 CmA, and the detected discharge capacity was evaluated as the discharge capacity at 1 CmA after high temperature storage test. The battery was charged after the discharges at a rate of 0.2 CmA. A discharge capacity maintaining ratio after the high temperature storage test, which is defined by a ratio of the discharge capacity at 1 CmA after high temperature storage test/the discharge capacity at 0.2 CmA before high temperature storage test was 81%.

(Measurement of Heat Shrinkage Ratio of Porous Film)

After injecting the electrolysis solution a positive electrode/porous film/negative electrode laminated body which had a predetermined size and was obtained by punching out, the laminated body was sandwiched between glass plates and wrapped in a fluorine sheet to suppress volatilization of the electrolysis solution, followed by placing thereon a spindle of 100 g. The thus-assembled object was kept in a temperature controlled room at 50° C. for 24 hours to cationically polymerize and crosslink the reactive polymer supported by the porous film in the laminated body, thereby having the positive and negative electrodes adhered to the porous film, i.e. the separator. After placing the negative electrode/porous film/positive electrode laminated body sandwiched between the glass plates in a drying machine of 200° C. for 1 hour, the negative electrode/porous film/positive electrode laminated body was taken out from between the glass plates; and the porous film was peeled off from the positive electrode and the negative electrode. The porous film was read by a scanner to detect an area shrinkage ratio with respect to the size before shrinkage. As a result, the porous film of this example had a heat shrinkage ratio of 16%.

Example 2

Preparation of Crosslinkable Polymer B

In a 500 mL three-neck flask having a reflux cooling tube, 40.0 g of methylmethacrylate, 20.0 g of 3-ethyl-3-oxetanylmethyl methacrylate, 0.8 g of 2-hydroxyethyl methacrylate, 19.2 g of butyl acrylate, 158 g of ethyl acetate, and of 0.2 g of N,N'-azobisisobutylonitrile were poured and mixed with stirring while introducing a nitrogen gas for 30 minutes, followed by beating to 70° C. to allow radical polymerization for 8 hours. After that, the thus-obtained reaction mixture was cooled to 40° C. To this reaction mixture, 0.2 g of N,N'-azobisisobutylonitrile was added, followed by heating to 70° C. again to allow radical polymerization for 8 hours. Then, the mixture was cooled to 40° C., and 295 g of ethyl acetate was added thereto, followed by stirring until the mixture becomes uniform, to thereby obtain an ethyl acetate solution of the generated polymer (concentration: 15 wt %).

Then, 100 g of the polymer solution was poured into 600 mL of methanol with stirring by a high speed mixer to obtain a precipitation. The precipitated polymer was separated by filtration, washed with methanol for several times, and then placed in a drying tube for drying with a drying nitrogen gas (a dew point: −150° C. or less) obtained by carbureting liquid nitrogen and allowed to pass through the drying tube. Further, the polymer was subjected to vacuum drying in a desiccator for 6 hours to obtain a crosslinkable polymer. The thus-obtained crosslinkable polymer was a white powder and had a weight average molecular weight of 383,000 and a number average molecular weight of 121,000 as a result of molecular weight measurement by GPC.

(Evaluation of Battery Characteristics, Measurement of Heat Shrinkage Ratio of Porous Film, and High Temperature Storage Test)

A reactive polymer-supported porous film was obtained in the same manner as in Example 1 except for using the crosslinkable polymer B in place of the crosslinkable polymer A and changing the additive amount of the polyfunctional isocyanate to 0.51 g (a ratio of a mole number of the isocyanate group of the polyfunctional isocyanate to a mole number of the reactive group of the crosslinkable polymer was 0.5). A gel fraction of the reactive polymer in the reactive polymer-supported porous film was 31.5%.

A coin type battery was obtained by using this porous film supporting the reactive polymer in the same manner as in Example 1. A discharge capacity maintaining ratio of 1 CmA/0.2 CmA of the battery was 96%, and a heat shrinkage ratio of the porous film of this example was 19%. Also, a discharge capacity maintaining ratio after high temperature storage test was 85%.

Example 3

Production of Porous Film B

After mixing 15 parts by weight of polyethylene resin composition formed of 20 wt % of EPDM (Espren 512F; product of Sumitomo Chemical Co., Ltd.; ethylidene norbornene content: 4 wt %) and 80 wt % of ultrahigh molecular weight polyethylene having a weight average molecular weight of 1,500,000 with 85 parts by weight of a liquid paraffin into a slurry-like state, the mixture was melted and kneaded at 160° C. for about 1 hour by using a small kneader. After that, the obtained kneaded material was sandwiched between metal plates cooled to 0° C. for rapid cooling and flattened to obtain a sheet. This sheet was heat-pressed at 115° C. until a thickness thereof reached to 0.4 mm and biaxially drawn at 123° C. simultaneously in vertical and horizontal directions at a draw ratio of 4.0 for each of the directions, followed by a desolvation treatment using heptane. The thus-obtained porous film was heated in the air at 85° C. for 6 hours, followed by heating at 116° C. for 1.5 hours, to perform a heat treatment on the porous film as well as to crosslink a crosslinkable rubber in the porous film, thereby obtaining a target porous film B. The porous film B had a thickness of 23 µm, a porosity of 42%, and a heat resistance temperature of 320° C. which was detected by the penetration probe type thermo mechanical analyzer.

(Battery Characteristics, Measurement of Heat Shrinkage Ratio of Porous Film, and High Temperature Storage Test)

A reactive polymer-supported porous film was obtained in the same manner as in Example 2 except for using the porous film B in place of the porous film A. By using the porous film B supporting the reactive polymer, a coin type battery was obtained in the same manner as in Example 1. A discharge capacity maintaining ratio of 1 CmA/0.2 CmA of this battery was 94%, and a heat shrinkage ratio of the porous film was 15%. Also, a discharge capacity maintaining ratio after high temperature storage was 86%.

Example 4

After adding 10 g of the crosslinkable polymer B to 90 g of ethyl acetate, the mixture was stirred at a room temperature to obtain a uniform crosslinkable polymer solution. To this crosslinkable polymer solution, 0.51 g of polyfunctional isocyanate used in Example 1 was added, followed by stirring at a room temperature for dissolution. A ratio of a mole number of an isocyanate group of the polyfunctional isocyanate to a mole number of a reactive group of the crosslinkable polymer was set to 0.5.

A crosslinkable polymer-supported-porous film was obtained in the same manner as in Example 1 except for obtaining a crosslinkable polymer-supported-porous film by coating the mixture solution of the crosslinkable polymer B and the polyfunctional isocyanate on one side of the porous film A by a wire bar (#12) and then heating the porous film A at 60° C. to volatilize ethyl acetate and to cause the porous film A to support the crosslinkable polymer at a coating density of 1.6 g/m².

A coin type battery was obtained in the same manner as in Example 1 except for obtaining a separator/electrode laminated body by laminating the positive electrode sheet on the reactive polymer-supporting surface of the reactive polymer-supported porous film and laminating the negative electrode on a reverse side (the surface not supporting the reactive polymer) of the porous film.

This battery had a discharge capacity maintaining ratio of 1 CmA/0.2 CmA of 97%, and a heat shrinkage ratio of the porous film was 29%. Also, a discharge capacity maintaining ratio after high temperature storage test was 84%.

Comparative Example 1

A coin type battery was assembled by using the porous film A of Example 1 as it is (without causing the porous film A to support the reactive polymer). This battery had a discharge capacity maintaining ratio of 1 CmA/0.2 CmA of 97%, and a heat shrinkage ratio of the porous film was 73%. Also, a discharge capacity maintaining ratio after high temperature storage test was 63%.

Comparative Example 2

Preparation of Porous Film C

After mixing 15 parts by weight of a polyethylene resin composition formed of 60 wt % of a polyethylene resin having a weight average molecular weight of 200,000 and 40 wt % of ultrahigh molecular weight polyethylene having a weight average molecular weight of 1,500,000 with 85 parts by weight of a liquid paraffin into a slurry-like state, the mixture was melted and kneaded at 160° C. for about 1 hour by using a small kneader. After that, the obtained kneaded material was sandwiched between metal plates cooled to 0° C. for rapid cooling and flattening to obtain a sheet. This sheet was heat-pressed at 115° C. until a thickness thereof reached to 0.5 mm and biaxially drawn at the same temperature simultaneously in vertical and horizontal directions at a draw ratio of 4.0 for each of the directions, followed by a desolvation treatment using heptane. The thus-obtained porous film was heated in the air at 85° C. for 6 hours, followed by heating at 116° C. for 1 hour, to obtain a target porous film C. The porous film C had a thickness of 24 μm, a porosity of 39%, and a heat resistance temperature of 160° C. detected by the penetration probe type thermo mechanical analyzer.

(Battery Characteristics, Measurement of Heat Shrinkage Ratio of Porous Film, and High Temperature Storage Test)

A reactive polymer-supported porous film was obtained in the same manner as in Example 1 except for using the porous film C in place of porous film A. By using the porous film C supporting the reactive polymer, a coin type battery was obtained in the same manner as in Example 1. A discharge capacity maintaining ratio of 1 CmA/0.2 CmA of this battery was 94%. A heat shrinkage ratio of the porous film was not detected since the porous film was broken during the measurement. Also, a discharge capacity maintaining ratio after high temperature storage was 82%.

While the present invention has been described in detail and with reference to specific embodiments thereof, it will be apparent to one skilled in the art that various changes and modifications can be made therein without departing from the spirit and scope thereof.

This patent application is based on Japanese patent application filed on Sep. 30, 2004 (Japanese Patent Application No. 2004-286078) and Japanese patent application filed on Jun. 13, 2005 (Japanese Patent Application No. 2005-171916), and contents of the Japanese patent applications are incorporated herein by reference.

INDUSTRIAL APPLICABILITY

According to this invention, it is possible to provide a reactive polymer-supported porous film which enables to produce batteries having sufficient adhesiveness between electrodes and a separator, reduced in internal resistance, and excellent in high rate characteristic. After the battery production, the porous film is useful as a battery separator that is free from melting and break under a high temperature and functions as a separator having a small heat shrinkage ratio. Further, this invention provides a production process for batteries using such reactive polymer-supported porous film.

The invention claimed is:

1. A reactive polymer-supported porous film for a battery separator, characterized in that the reactive polymer-supported porous film comprises:

a substrate porous film of a porous film, the porous film has a temperature, at which a thickness of the porous film is reduced to ½ of a thickness when a probe is placed on the porous film in the case that the thickness of the porous film is measured by placing the probe having a diameter of 1 mm on the porous film under a load of 70 g and heating the porous film from a room temperature at a temperature-increase rate of 2° C./minute,
of 200° C. or more; and
a reactive polymer supported on the substrate porous film, the reactive polymer is obtainable by reacting:
a crosslinkable polymer obtainable by copolymerizing: a crosslinkable monomer having in a molecule a 3-oxetanyl group; and a crosslinkable monomer having a reactive group capable of reacting with an isocyanate group; and
a polyfunctional isocyanate
to be partially crosslinked,
wherein the substrate porous film comprises a polyolefin resin composition comprising: a polyolefin resin having a weight average molecular weight of at least 500,000; and a crosslinkable rubber having a double bond in a molecular chain, and
the substrate porous film is obtainable by crosslinking the crosslinkable rubber.

2. The reactive polymer-supported porous film according to claim 1, which has a carboxyl group or a hydroxyl group as the reactive group capable of reacting with the isocyanate group of the crosslinkable polymer.

3. A process for producing batteries, characterized in that the process comprising laminating an electrode on the reactive polymer-supported porous film according to claim 1 or 2 to obtain an electrode/reactive polymer-supported porous film laminate;

inserting the electrode/reactive polymer-supported porous film laminate into a cell, and then;
injecting an electrolysis solution containing a cationic polymerization catalyst into the cell to swell at least a part of the reactive polymer or to elute at least a part of the reactive polymer into the electrolysis solution at least in the vicinity of a boundary between the porous film and the electrode; and
gelating at least a part of the electrolysis solution through cationic polymerization to adhere the porous film and the electrode.

4. A lithium rechargeable battery obtainable by using the reactive polymer-supported porous film according to claim 1 or 2 as a separator.

5. The lithium rechargeable battery according to claim 4, wherein a discharge capacity at 1 CmA after being stored for 2 days under a temperature controlled environment of 85° C. in a fully charged state is 70% or more of a discharge capacity at 0.2 CmA before the storage.

* * * * *